United States Patent Office 3,124,486
Patented Mar. 10, 1964

3,124,486
METHOD OF MANUFACTURING STORAGE
BATTERY ELECTRODES
James P. Malloy, Cheltenham, Pa., assignor to The Electric Storage Battery Company, a corporation of New York
No Drawing. Filed Dec. 28, 1960, Ser. No. 78,876
4 Claims. (Cl. 136—27)

The present invention relates to an improvement in lead acid storage battery electrodes of the type having spaced pencils of active material mounted on metal spines which extend between top and bottom bars and which are surrounded with a suitable insulating sheath or tube adapted to hold the active material to the individual spines. More specifically, the present invention is concerned with a new and improved method for processing the active material utilized in battery electrodes of the type described.

In the manufacture of tubular type battery electrodes the tubes or active material retainers are filled by introducing lead oxides in powdered form into the annular space between the tubes and the spines and compacting it by vigorous shaking and high impact hammering. In order to achieve a high initial capacity it is standard practice to utilize the minium or red oxide of lead, $Pb_3O_4$, as the active material. Where initial battery capacity is not a factor, uncalcined litharge PbO, has been utilized as the active material inasmuch as this oxide is less expensive. Both of these active materials however, have poor flow characteristics in that they tend to agglomerate, stick, and cause voids in the filled tubes. This problem is aggravated as the apparent density of the active material utilized decreases. These agglomerate, sticking characteristics are attributed to the surface charge characteristics of the lead oxide particles and their particle shapes.

Heretofore the tubes for such plates have been made out of slotted ebonite or a thermoplastic material such as polyethylene. In an effort to provide plates of improved electrical performance and of lower cost, however, it has been proposed to utilize tubes woven of acid resistant threads of glass or suitable synthetic resins. Such tubes may be woven, knitted, or braided individually or a row of tubes may be produced in a single weaving or like operation with individual tubes being interconnected by a small width of fabric. For good battery performance, such textile tubing must be thin and highly porous to maintain the internal battery resistance low, and, in addition, have pores of such a nature as to prevent the silting therethrough of the active material. It has been found, however, that because of these requirements, textile tubing tends to be flabby and as a result, it becomes difficult to fill them with active material by conventional methods. It has been proposed to stiffen such tubing, when made from certain synthetic resins, by heat treating them while on a mandrel to shrink and set the fabric. This shrinkage treatment while beneficial with regard to the shape and dimensional accuracy of the tubing does not completely overcome the tendency to flabbiness in the finished product. It has also been proposed to spray such tubing with a stiffening agent, however, such treatment has been found to reduce the porosity of the tubing to such an extent as to be impractical.

Accordingly, it is an object of the present invention to provide a new and improved method for processing the active material utilized in the electrodes of the type described, which will improve the flow characteristics of the lead oxide active materials utilized in tubular type battery plates, reduce tube filling time, permit simplification of the filling equipment, permit the utilization of less rigid tubing and the filling of tubes of smaller diameter.

It is another object of the present invention to provide a means for processing the active material utilized in tubular type battery electrodes, which would provide a means for controlling the density of the active material fill.

It is a further object of the present invention to provide means for achieving a uniform filling with active material and a uniform pack density in tubular type battery electrodes thereby eliminating conditions which prevent such electrodes from having uniform current densities across their surfaces.

In accordance with the present invention the lead oxide active material for tubular type battery electrodes is pre-pelletized to produce granules of a specific size that will not retain their individual identity during processing, are free flowing, and which form a solid mass of active material upon formation. This is accomplished by mixing the oxides with between 4% and 10% by weight of water under conditions such that the oxide is vigorously agitated, the water addition being introduced into the agitated oxide as a fine spray. Other liquids such as alcohol, acetone, and solutions of sulfuric acid and water may be utilized for the pelletizing of the lead oxides to achieve other advantages. The pellets produced were such as would all pass through a 20-mesh screen. Following the pelletizing, the processed active material is then dried to provide a free flowing active material for introduction into the electrode tubes.

Other objects and advantages of the present invention will be readily apparent from the description of the preferred embodiments thereof.

In carrying out one form of the present invention, red lead oxide having an apparent density of 16 to 18 was pelletized with 7.3 parts by weight of water to each 100 parts by weight of the oxide. The addition of the water to the lead oxide was accomplished while it was being violently agitated and the water was added in a fine spray to the particles undergoing agitation. Specifically, the blending of the water and the red leads was accomplished in a liquid solid blender of the twin shell type manufactured by the Patterson-Kelley Company. A test batch was prepared, pelletizing thirty-five pounds of red lead having the apparent density specified hereinbefore with the mixing being accomplished in ten minutes. The pelletized red lead produced with the addition of 7.3 parts by weight of water was a free flowing mixture having a granular size such that it all passed through a 20-mesh screen and having better than 50% of the batch pass through an 80-mesh screen. Following the blending of the water and oxides, the batch was dried in a rotating type vacuum dryer. Following the drying step, the free flowing pelletized lead oxide was introduced into the active material tubes of a storage battery electrode with the filling time being accomplished in less than ten seconds which is a reduction of 50% over the time required to fill identical tubes with unpelletized lead oxide. In addition, the filling was accomplished with only slight vibration of the tubes in place of the high impact hammering and vigorous shaking heretofore utilized. Following the filling of the tubes with the pelletized oxide the tubes were given the conventional soaking in sulfuric acid to set or sulfate the active material in preparation for subsequent formation. The electrodes thus produced were formed in the conventional way and found to give equal or better performance in all respects to electrodes processed in the prior art manner.

Modifications may be made in the processes as described above. For example, it has been found that depending upon the apparent density of the lead oxide to be pelletized, that the amount of water utilized for the pelletizing may be varied within 4% to 10% by weight of the lead oxide to produce pelletized granules of the desired size. In this respect, it has been found that granules larger than those that will be retained on a 20-mesh screen tend to retain their individual identity through processing and do not bond together to give a solid mass of active material. In addition, it has also been found that if more than 10% of the pelletized oxide will pass through a 325-mesh screen, that the desired flow characteristics will not be achieved.

The amount of water required varies with the fineness of the oxide such that finer red lead oxides, i.e., oxides having apparent densities of 6 to 18 have been found to require 6% to 10% by weight of water to produce pellets of a desirable size, while more standard types of red leads, i.e., oxides having an apparent density above 20, require 4% to 8% by weight of water. Other liquids such as alcohol, and acetone, may be used to pelletize the oxides and these specific liquids have the advantage of greatly reducing the drying time. In addition, mixtures of sulfuric acid and water may be utilized as the pelletizing agent and provide a means for varying the bulk density of the oxide. As will be understood by those skilled in the art, the sulfuric acid promotes the formation of lead sulfates which have a lesser density than the lead oxides. Accordingly, this provides a means for varying the bulk density of the filling material. It has been found that acid may be added in amounts up to 25% by weight of lead sulfate in the finished blend. The amount of water mixed with the acid to create the pelletizing effect remains approximately the same as if the acid were not present. For example, when using a solution of 25% by weight of sulfuric acid, the amount of solution used to achieve the desired degree of pelletization would be the weight of water required divided by 0.75. The teachings of the present invention have also been found applicable to the pelletizing of uncalcined litharge. Inasmuch as the litharge commercially available generally has a higher apparent density, i.e., 22 to 24, less water is required to produce the desired degree of pelletization. In this respect, 4% to 7% by weight of water has been found applicable.

Having described the present invention that which is claimed as new is:

1. In the method of manufacturing lead battery electrodes of the type in which the active material is mounted on metal spines and held thereagainst by insulating sheaths the improvement which comprises pelletizing the lead oxide active material prior to filling said sheaths by the addition of water in a fine spray to said oxide while said oxide is being vigorously agitated in an amount of from 4% to 10% by weight of said oxide to produce oxide granules such as will all pass through a 20-mesh screen and no more than 10% will pass through a 325-mesh screen.

2. The method of claim 1 where sulfuric acid is added to said oxide in addition to said amount of water.

3. In the method of manufacturing lead battery electrodes of the type in which lead oxide is utilized as the starting material to produce active material which is mounted on metal spines and held thereagainst by insulating sheaths the improvement which comprises pelletizing the lead oxide by the addition thereto of a liquid selected from the group consisting of water, acetone, and alcohol, in an amount of from 4% to 10% by weight of said oxide and while said oxide is being vigorously agitated to produce oxide granules such as wall all pass through a 20-mesh screen and no more than 10% will pass through a 325-mesh screen.

4. A method of manufacturing battery electrodes of the type in which the active material is mounted on metal spines and held thereagainst by insulating sheaths which comprises pelletizing lead oxide by the addition of water in an amount of 4% to 10% by weight of said oxide in a fine spray to said oxide while said oxide is being vigorously agitated to pelletize said oxide so as to form oxide granules such as will all pass through a 20-mesh screen and no more than 10% will pass through a 325-mesh screen, drying said pelletized oxide, introducing said pelletized oxide into the annular space between said insulating sheath and said pine, soaking said electrode in sulfuric acid to sulfate said oxide and forming said electrode.

References Cited in the file of this patent
UNITED STATES PATENTS

| | | |
|---|---|---|
| 571,143 | Woodward | Nov. 10, 1896 |
| 1,499,901 | Anderson | July 1, 1924 |
| 2,132,423 | Klinker | Oct. 11, 1938 |
| 2,257,018 | White | Sept. 23, 1941 |
| 2,287,868 | Daily | June 30, 1942 |
| 2,347,131 | Seabury et al. | Apr. 18, 1944 |
| 2,588,170 | Smith | Mar. 4, 1952 |
| 2,627,457 | Kerley | Feb. 3, 1953 |

FOREIGN PATENTS

| | | |
|---|---|---|
| 257,019 | Great Britain | Aug. 20, 1926 |